United States Patent [19]

Lynch

[11] 4,253,583
[45] Mar. 3, 1981

[54] CLOSURE FOR CONTAINER

[75] Inventor: Brian Lynch, Norcross, Ga.

[73] Assignee: Western Electric Company, Inc., New York, N.Y.

[21] Appl. No.: 117,315

[22] Filed: Jan. 31, 1980

[51] Int. Cl.³ .............................................. B65D 41/16
[52] U.S. Cl. .................................. 220/319; 220/327; 215/272; 215/274; 292/256.6
[58] Field of Search .................. 220/319, 320, 327; 215/272, 274; 292/256.6, 256.65, 256.67

[56] References Cited

U.S. PATENT DOCUMENTS

| 2,712,086 | 6/1955 | Winograd | 220/319 X |
| 3,313,599 | 4/1967 | Boon | 220/327 X |
| 3,559,844 | 2/1971 | Schlosberg | 220/327 X |

Primary Examiner—George T. Hall
Attorney, Agent, or Firm—E. W. Somers

[57] ABSTRACT

A closure which is particularly useful to seal a container of material that is used in a process for the manufacture of preforms from which fiber lightguides are drawn includes an annular seal having a tapered opening therethrough. The annular seal is supported in engagement with an outwardly facing surface of a flared neck of a container by a shelf of an annular retainer which is held about the neck by an adjustable clamp which is disposed about the retainer. The neck opens to an external surface of the container which is covered by a stepped cap made of plastic material that is clamped in engagement with a ring seal positioned in a groove formed in the external surface by an outer clamp plate. A smaller diameter portion of the cap is received in a centrally disposed opening of the outer clamp plate which is connected to the retainer by a plurality of circumferentially disposed fasteners. Advantageously, the outer clamp plate, cap and ring seal can be removed from the container to provide access for cleaning, for example, without removing the annular seal, retainer and adjustable clamp.

11 Claims, 5 Drawing Figures

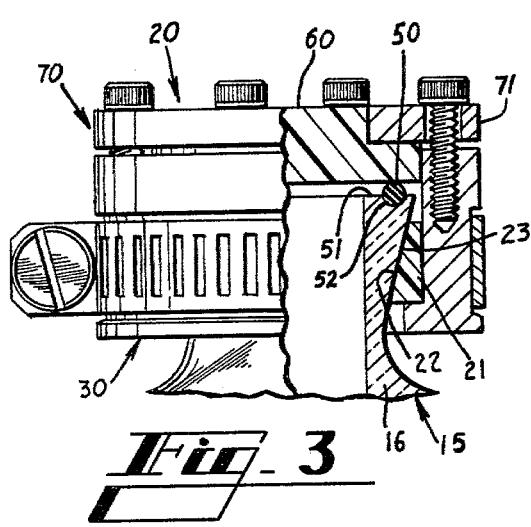
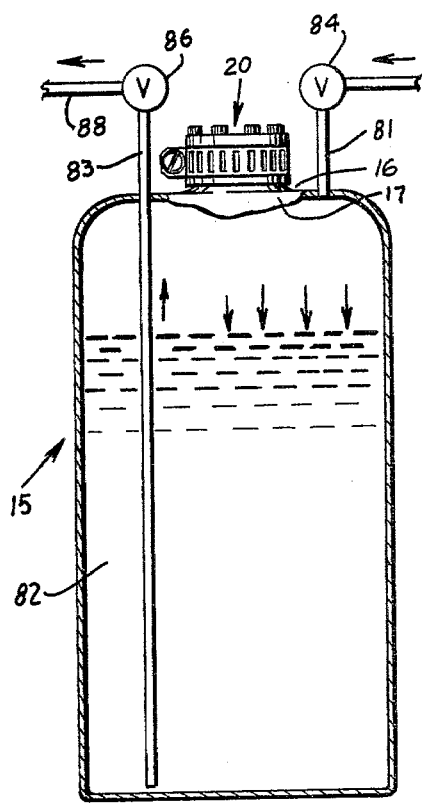
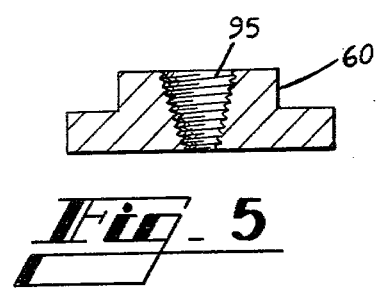
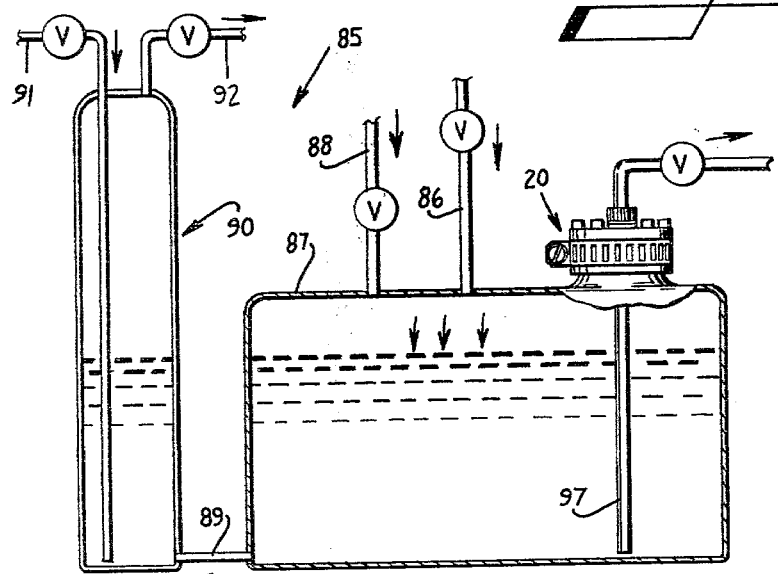

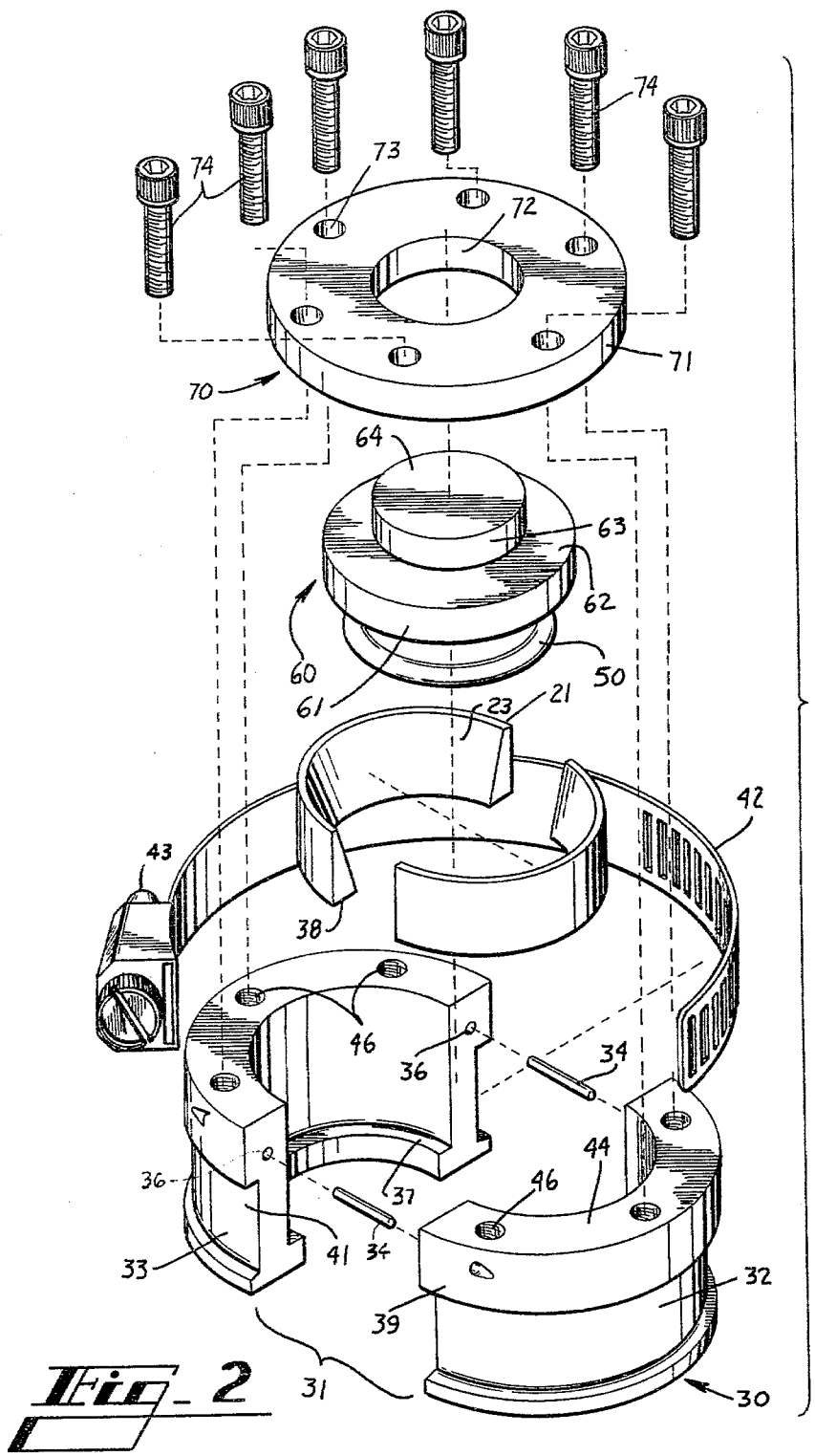
Fig_2

CLOSURE FOR CONTAINER

TECHNICAL FIELD

This invention relates to a closure for a container, and, more particularly to a closure for a glass container, said closure being effective to provide a pressurized seal for the container and being easily disassembled therefrom to provide access to its interior.

BACKGROUND OF THE INVENTION

With the advent of fiber lightguides for use in the communications industry, much emphasis has been placed on vapor disposition as a forming technique for a preform from which lightguides are drawn. In manufacturing preforms from which fiber lightguides may be drawn, vapors of materials such as $SiCl_4$, $GeCl_4$ and $POCl_3$ must be precisely delivered at controlled mass flow rates to a preform manufacture site where they are reacted and deposited on or in a support. This can be done by passing carrier gases such as oxygen, for example, through a supply of the material in liquid form to the deposition site as a mixture with the vapors entrained in the carrier gas.

In performing this operation, a vaporizer of the type known as a bubbler is ordinarily used. The bubbler generally has a carrier gas intake conduit that terminates with an outlet orifice located below the surface of a liquid material and an outlet conduit extending from the space above the surface of the liquid within the bubbler to the deposition site. Exemplary of deposition systems employing bubblers is that illustrated in U.S. Pat. No. 3,826,560.

Typically, the bubbler is supplied with a liquid that is caused to be transferred from a pressurized container which is made of glass and which is also used for shipping. Each of these containers is made with valved tubes which include a pressure application tube and a dip tube extending through and welded to a top of the container. The top of the container also includes a cleanout port to provide access to the interior of the container for cleaning and filling purposes.

The port in the top of the container could be eliminated and the container filled through one of the tubes which are later valved. However, the capability of cleaning the interior of the container of sediment deposits to permit its reuse instead of the costly alternative of discarding used containers requires the use of the port.

The construction of a container with a port requires that the port be sealed during shipment and during use. The seal must be such that it allows pressurization of the interior of the container during the transfer process. Furthermore, the seal must prevent leakage of the contents during shipment and must prevent the ingress of moisture which would contaminate the contents of the container.

One apparent solution is the construction of the container top to include a threaded port to be fitted with a threaded plug. This arrangement has not proved to be a feasible one since the plug tended to become welded to the material of the container so that the application of turning forces to the plug caused a rupture of the container.

The prior art is replete with patents dealing with closures. One such as that shown in U.S. Pat. No. 1,609,453, for example is a typical bottle closure comprising a cap and a carrier with the carrier being lifted to permit the cap to spring open. In recently issued U.S. Pat. No. 3,301,425, a sealing ring which is pressed around a skirt that surrounds a bulbous mouth of a container includes an upwardly directed sharp edge that protrudes into the skirt and prevents the ring from sliding along the skirt. The ring in the latter described arrangement is made of a material that will burst or be permanently deformed when the cap is removed from the bottle.

Seemingly the prior art is devoid of a reuseable closure for a container having a bulbous mouth which provides effective sealing of the container from egress of its contents or ingress of contaminants and which is easily removeable from the container to provide access to the interior.

SUMMARY OF THE INVENTION

The foregoing problems of providing a closure for an access port of a container have been overcome by the closure of this invention which includes a first portion that comprises an annular seal. The annular seal which is preferably made of plastic and which engages an exterior surface of a neck portion of a container to be sealed has an opening which conforms to the neck portion. The annular seal is supported in engagement with the neck portion of the container by retaining means of the first portion of the closure. In order to support the first portion so that the annular seal is held in engagement with the neck portion, an adjustable clamp is disposed about an exterior surface of the first portion.

The container is formed so that an external surface of the neck portion to which the port opens has a groove formed therein for receiving a ring seal of a second portion of the closure, said ring seal being compressed by a stepped cap that engages the ring seal. The second portion of the closure also includes an outer clamp plate having an opening disposed centrally therein for receiving a small diameter portion of the cap. The outer clamp plate is secured to the retaining means of the first portion by a plurality of circumferentially disposed fasteners which also cause the outer clamp plate and the cap to be moved toward the retaining ring to compress the ring seal into clamped engagement with the container.

BRIEF DESCRIPTION OF THE DRAWINGS

Other features of the present invention will be more readily understood from the following detailed description of specific embodiments thereof when read in conjunction with the accompanying drawings, in which:

FIG. 1 is a view in elevation of a container which is sealed with a closure of this invention to facilitate its use both for shipping and for processing.

FIG. 2 is an exploded view of the closure;

FIG. 3 is a detail view, partially in section, of the closure of FIG. 1;

FIG. 4 is a schematic view of an apparatus which is used to supply vapor material to a preform from which fiber lightguides are drawn and which includes a container also having a closure; and FIG. 5 is a detail view of a modified closure.

DETAILED DESCRIPTION OF THE INVENTION

Referring now to FIG. 1, there is shown a container 15 which includes a neck 16 having an access port 17 through which the container may be filled and which may be used to access the interior for cleaning. In order to ship the container 15 without inadvertent spillage of its contents and to seal it so that it can be pressurized to remove its contents in a deposition process, for example, the formed neck 16 is provided with a closure, designated generally by the numeral 20, of this invention.

Turning now to FIGS. 2-3, it can be seen that the closure 20 includes a lower annular seal 21 which is comprised of two portions and which in an assembled condition about the neck 16 of the container 15 has a tapered opening 22 therethrough. When the closure 20 is in engagement with the neck 16, the larger diameter portion of the tapered opening 22 is oriented upwardly. The seal 21 is made of a deformable material such as for example, TEFLON® plastic, which resists degradation by any expected contents of the container.

When the seal is positioned on the container 15, an inclined surface 23 of the tapered opening 22 is supported in engagement with the neck 16 by a lower clamping assembly 30. The lower clamping assembly 30 includes a clamping ring 31 which is comprised of halves 32 and 33 that are assembled with the aid of guide pins 34—34 which are received in holes 36—36. Each half 32 and 33 is formed with a ledge 37 for seating a lower surface 38 of the lower seal 21. Further, the outwardly facing surface 39 of each half 32 and 33 is formed with a recess 41 for receiving a familiar metallic pipe clamp 42. The pipe clamp 42 is available commercially such as for example those marketed by the Ideal Clamp Co. of Brooklyn, New York. The clamp 42 includes a bolt 43 which is turned in one direction to draw the clamp 42 into tighter engagement with the seal 21 and hence the seal 21 into tighter engagement with the neck 16 of the container 15 and which is turned in an opposite direction to reduce the pressure. The clamp 42 may also include a quick release feature such as is shown in U.S. Pat. No. 3,175,271 so that a simple pivotal movement of the bolt disengages the two free ends of the clamping ring. An upper surface 44 of the halves 32 and 33 of the clamping assembly 30, as seen in FIG. 2, is provided with a plurality of threaded apertures 46—46.

The closure 20 also includes an O-ring seal 50 which is adapted to be seated in engagement with a top surface 51 of the neck 16. In a preferred embodiment, the top surface 51 of the neck 16 is formed with a circular groove 52 for receiving the seal 50. Like the lower seal 21, the O-ring seal 50 is made of a deformable material such as, for example, a TEFLON® plastic coated material and one which is not degraded by the expected contents of the container 15.

The seal 50 is compressed in engagement with the surface 51 by an upper seal 60 which is disc-shaped and which has a stepped outer peripheral surface 61. The stepped surface 61 includes a ledge 62 and wall 63 which joins the ledge to an upper surface 64. Generally, the diameter of a large diameter portion of the disc-shaped seal 60 is no greater than the inside diameter of the lower clamping ring in an assembled condition. Moreover, when the seal 60 is placed in engagement with the O-ring seal 50, the ledge 62 is at a slightly higher elevation than the upper surface 44 of the lower clamping assembly 30.

In order to apply compressive forces to the seal 60 to compress the O-ring seal 50, the closure 20 includes an upper clamping assembly 70 which includes an annular member 71 having an opening 72 formed therethrough. The opening 71 has a diameter which is sufficiently large to receive the smaller diameter portion of the upper seal 60. The outer diameter of the member 71 is generally equal to that of the lower clamping assembly 30 in its assembled condition. The annular member 71 is formed with a plurality of apertures 73—73 arrayed about its peripheral surface and disposed radially so that when the member 71 is positioned in engagement with the seal 60, the apertures 73—73 are aligned with the apertures 46—46 in the lower clamping assembly 30. The upper clamping assembly 70 also includes a plurality of threaded bolts 74—74 which are received in the aligned apertures 73—73 and 46—46 to secure the upper clamping assembly to the lower clamping assembly and to apply compressive forces to the O-ring seal 50.

The use of the closure 20 transforms what is merely a shipping container into a reuseable container that is used for shipping and processing. The sealing of the container 15 with the closure 20 permits the input of pressurized gas through a welded, valved tube 81 (see FIG. 1) to cause a contact liquid 82 such as silicon tetrachloride, for example, to be moved out of the container through a supply pipe 83. Valves 84 and 86 on the tube 81 and pipe 83, respectively, are of course closed and plugged during shipment.

The liquid is supplied to a process control apparatus 85 (see FIG. 4) such as that, for example, which may be used in the manufacture of preforms from which fiber lightguides are drawn and which is described in application Ser. No. 967,806 filed Dec. 8, 1978 in the name of F. P. Partus. The application of a pressurized fluid through a tube 86 to a vessel 87 that is supplied with the liquid 82 through a conduit 88 causes a liquid to be supplied along a conduit 89 to a bubbler 90 into which oxygen is fed along a conduit 91 and which supplies a vapor through a conduit 92 to a glass tube (not shown) which is being optically layered. As can be seen in FIG. 4, the vessel 87 may include a sampling tube 97 which extends through a closure 20 of this invention. The cap 60 is modified to include an aperture through which the tube 97 extends. Advantageously, the use of the closure 20 to seal the vessel 87 permits access to its interior at selected times for cleaning.

The process use of the liquid 82 causes the accumulation of sediment in the container 15, the sediments having to be removed before the refilling of the container. This is facilitated by the closure 20 of this invention and is begun by a workperson turning the bolts 74—74 to remove them from the aligned apertures 73—73 and 46—46. This permits the annular member 71 to be disengaged from the seal 60 to permit its removal. The O-ring seal 50 is lifted from the seating groove 51 and the container is cleaned, advantageously, with the lower seal 21 and lower clamping assembly 30 still assembled to the neck 16.

After refilling, the workperson reseats the O-ring seal 50 in its groove 51, positions the member 71 in engagement with the O-ring seal and then moves the member 71 to cause the upper portion 62 of the seal 60 to be received in the opening 72 of the upper clamping assembly 70 and the apertures 73—73 and 46—46 to be aligned. Then the bolts are inserted into the apertures 73—73 and turned to move them into the threaded apertures 46—46 to secure the upper clamping assembly to the lower clamping assembly 30.

It is to be understood that the above-described arrangements are simply illustrative of the invention. Other arrangements may be devised by those skilled in the art which will embody the principles of the invention and fall within the spirit and scope thereof.

What is claimed is:

1. A closure for sealing a container having a portion which communicates the interior of the container with an external surface of said container, said closure comprising:
   an annular seal which is adapted to be disposed about a portion of the container which communicates the interior of the container to an external surface of the container through an opening in the external surface;
   retaining means which is adapted to be disposed about said annular seal for supporting said annular seal in clamped engagement with said portion of the container;
   means adapted to engage said external surface of the container for sealing the opening; and
   means which is adapted to be assembled to said retaining means for causing said sealing means to be moved into clamped engagement with said external surface.

2. The closure of claim 1, wherein said retaining means includes
   a retaining ring which is adapted to be disposed about said annular seal; and
   adjustable clamping means adapted to be disposed about said retaining ring for holding said ring in clamped engagement with said annular seal.

3. The closure of claim 2, wherein said annular seal comprises two parts and said retaining ring comprises two parts which which are capable of being assembled about said annular seal.

4. The closure of claim 2, wherein said retaining ring includes a recess for receiving said annular seal and a shelf for supporting said annular seal to prevent inadvertant movement along the outwardly facing surface of said portion of the container.

5. The closure of claim 1, wherein said annular seal has a tapered opening formed therethrough.

6. The closure of claim 2, wherein said sealing means includes a ring seal which is adapted to be seated in engagement with the external surface and a cap which is adapted to be moved and held in clamped engagement with said ring seal.

7. The closure of claim 6, wherein said cap has a stepped configuration and includes a large diameter portion which is adapted to engage said ring seal and a small diameter portion.

8. The closure of claim 7, wherein said causing means includes an annular plate-shaped member having an opening therein, said opening of said annular member adapted to receive said small diameter portion of said cap, said annular member having a surface being juxtaposed with a surface of said retaining ring when said closure is assembled to the container.

9. The closure of claim 8, wherein said annular member includes a plurality of apertures therethrough and said retaining ring includes a plurality of threaded bores disposed circumferentially about said surface of said ring and aligned with said apertures when said annular member is positioned adjacent said retaining ring, said causing means also including a plurality of threaded fasteners which are adapted to be extended through said openings in said annular member and turned into said bores to secure said annular member to said retaining ring and to move said cap to compress said ring seal into clamped engagement with the external surface of the container.

10. A sealed container, which includes:
    a container which includes a neck portion, said neck portion having an access port formed therein, said neck portion having a lateral surface and a substantially planar surface to which said port opens, said planar surface having a groove formed therein; and
    a closure which is assembled to said container to prevent egress of its contents and to prevent ingress of contaminants, said closure comprising;
    an annular seal which is disposed about said lateral surface of said neck;
    retaining means which is disposed about said annular seal for supporting said annular seal in clamped engagement with said lateral surface;
    a sealing ring made of a deformable material, said ring being disposed in said groove of said planar surface;
    a cap which engages said sealing ring and which closes said access port;
    a clamping member which is disposed adjacent said retaining ring for holding said cap in clamped engagement with said ring; and
    means for securing said clamping member to said retaining means.

11. The sealed container of claim 10, wherein said means for securing said clamping member to said retaining means includes means for causing said clamping member to be moved toward said retaining means to cause compressive forces to be applied to said cap and to said sealing ring.

* * * * *